Aug. 31, 1965     D. P. CROWDER     3,203,659
POSITIONING MECHANISM
Filed April 10, 1964     3 Sheets-Sheet 1

INVENTOR.
DAVID P. CROWDER
BY
*George C. Sullivan*
Agent

INVENTOR.
DAVID P. CROWDER
BY
George C. Sullivan
Agent

Aug. 31, 1965  D. P. CROWDER  3,203,659
POSITIONING MECHANISM
Filed April 10, 1964  3 Sheets-Sheet 3

INVENTOR.
DAVID P. CROWDER
BY
George C. Sullivan
Agent

United States Patent Office 3,203,659
Patented Aug. 31, 1965

3,203,659
POSITIONING MECHANISM
David P. Crowder, Fort Worth, Tex., assignor, by mesne assignments, to Lockheed Aircraft Corporation, Burbank, Calif.
Filed Apr. 10, 1964, Ser. No. 358,798
9 Claims. (Cl. 248—323)

This invention relates to a positioning mechanism, and more particularly to a mechanism for slidably positioning an apparatus from one location to another.

On an aircraft flight deck, where the positioning apparatus of this invention finds particular utility, there is little room for the stowage of all the equipment necessary for the proper performance of the aircraft's mission. One such piece of equipment is the special purpose radar scope located at the navigator's table. This scope is only needed during portions of a flight and for its proper operation it must be readily positionable in front of the navigator at will and out of the navigator's way while not in use so that he can obtain maximum utility from the limited space available to him.

This invention solves this problem with economy by providing a positioning mechanism which is light in weight, requires no expensive machine tooling, and is easily operated to position an apparatus between a stowed position in one plane to an operate position angularly related to the stowed position in another plane by a single movement by the operator.

Accordingly, it is an object of this invention to provide a positioning mechanism for positioning an apparatus mounted thereon between a first position and a second position.

Another object of this invention is to provide a mechanism for slidably positioning an apparatus mounted thereon between a first position in one plane and a second position angularly related to said first position in a second plane.

A further object of this invention is to provide a positioning mechanism having a first contoured portion and a second portion mounted in guided engagement with the first contoured portion.

A still further object of this invention is to provide a positioning mechanism including a mounting portion having at least three spaced-apart guide tracks and a positioning portion having a guide guidably engaging each of the guide tracks on the mounting portion.

Other objects and advantages will become apparent from the following description taken in connection with the accompanying drawings in which.

Generally stated, this invention comprises a positioning mechanism for positioning an apparatus mounted thereon between a first and second position. The positioning mechanism includes a mounting portion which is contoured along its length in the configuration of the path desired to be traversed by the apparatus mounted thereon. Guides are provided on the positioning portion which are mounted in guided, cooperating engagement with the mounting portion such that the positioning portion follows the contour of the mounting portion when moved relative thereto. To eliminate the need for the close tolerance machining of parts, the positioning portion guides are resiliently biased into guided engagement with the mounting portion. The resilient mounting of the mounting portion with respect to the positioning portion also serves to dampen vibrations transmitted to the positioning portion.

Figure 1:
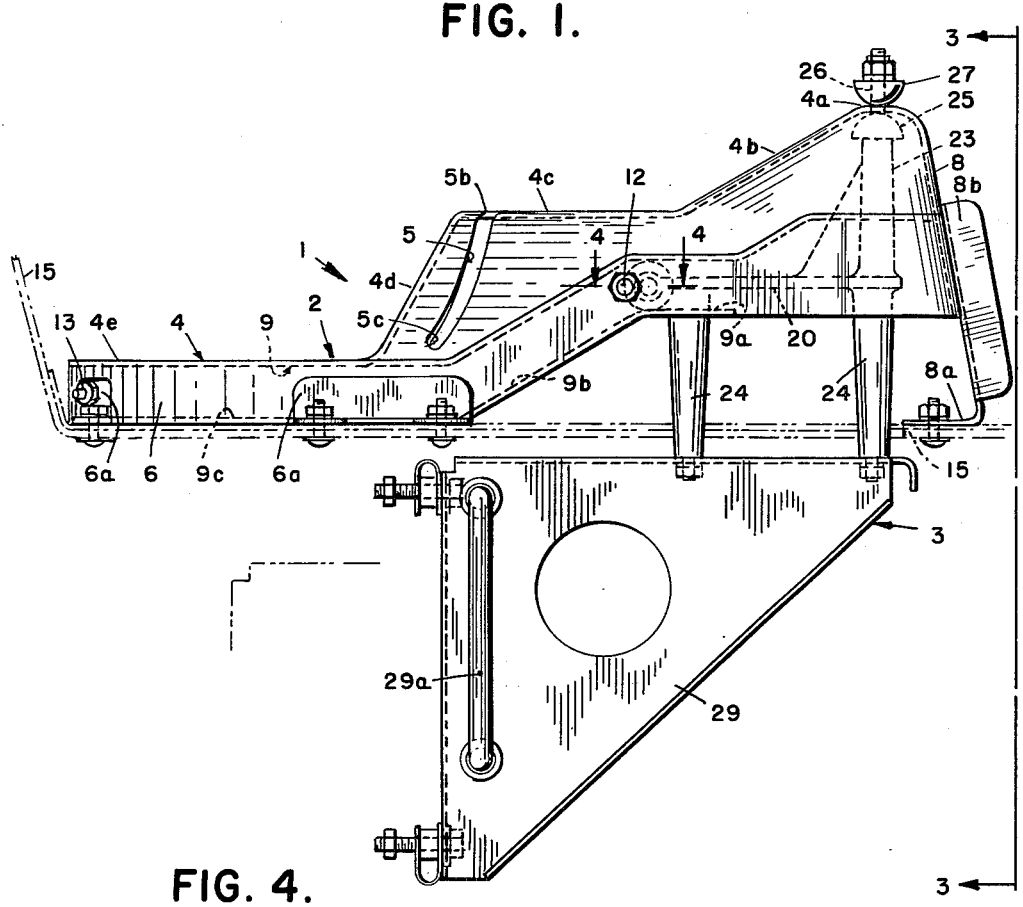
FIGURE 1 is a side elevational view of the positioning mechanism of this invention.
Figure 4:
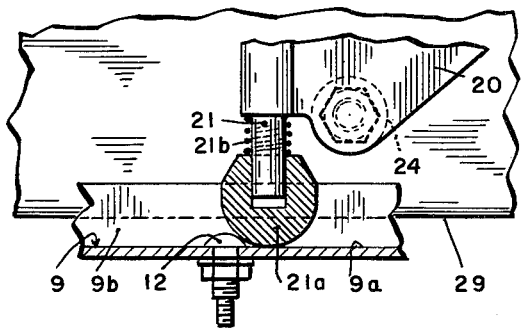
FIGURE 4 is a fragmentary view, partially in section, of a guide leg taken along the reference line 4—4 of FIGURE 1.
Figure 2:
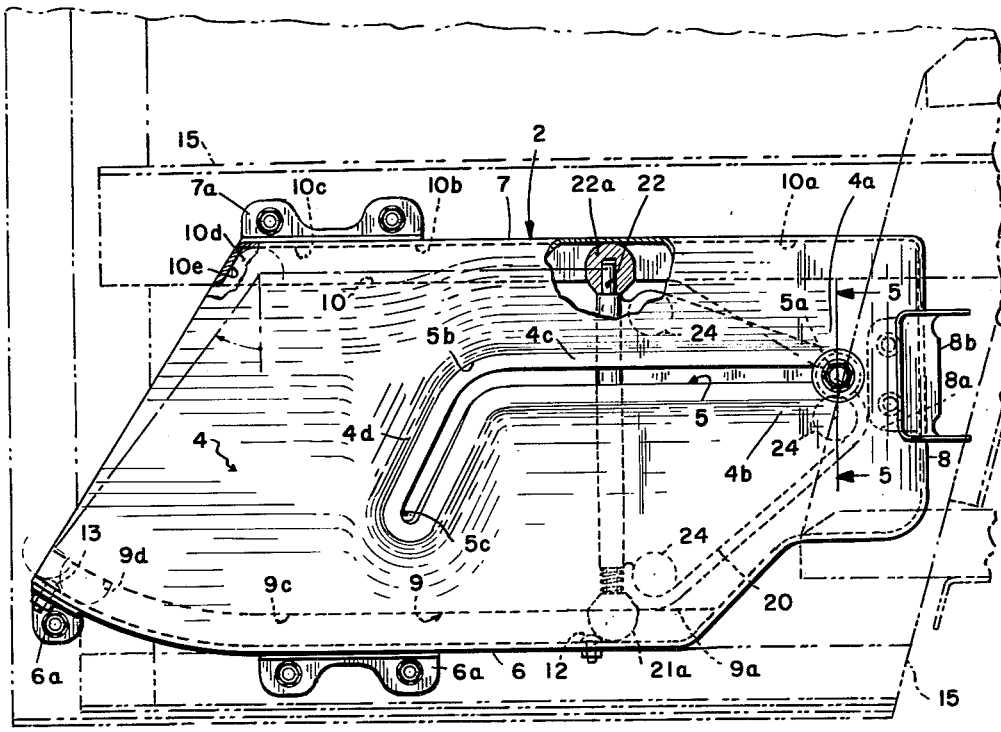
FIGURE 2 is a top plan view of the positioning mechanism of this invention.
Figure 3:
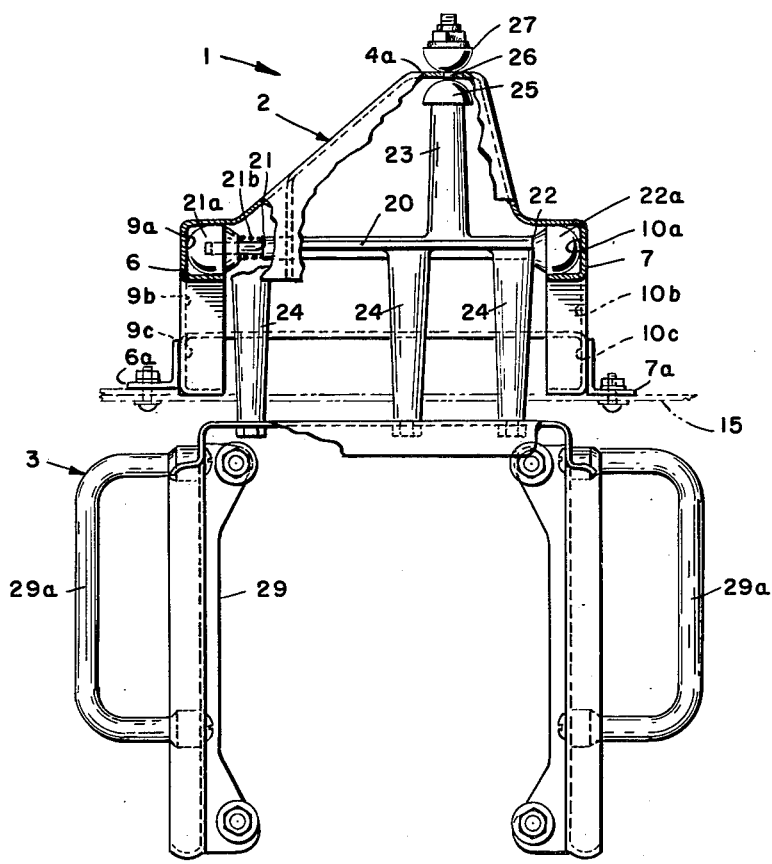
FIGURE 3 is an end elevational view of the positioning mechanism of this invention taken along line 3—3 of FIGURE 1.

More specifically, there is shown in FIGURES 1, 2 and 3 the positioning mechanism 1 which comprises a mounting portion 2 and a positioning portion 3. Mounting portion 2 is contoured along its length and in elevation, as viewed in FIGURE 1, its top surface 4 has an elevated surface 4a, slopes downwardly from 4a along slope 4b to the horizontal planar surface or plateau 4c, then slopes downwardly along slope 4d to the horizontal planar surface 4e. As best seen in FIGURE 2, the top surface 4 has a slot or guide track 5 therein which has its one end 5a on the elevated surface 4a, extends in a straight line to point 5b at the end of plateau 4c, and then downwardly to the bottom of slope 4d at an angle with respect to its original axis to terminal point 5c.

The mounting portion 2 includes sidewalls 6 and 7 and the end wall 8, all of which are preferably formed integrally with the top surface 4. The sidewalls 6 and 7 have brackets 6a and 7a secured thereto permitting bolting of the sides of the mounting portion 2 to the support 15, while the end wall 8 includes an in-turned flange 8a permitting bolting of the end of the mounting portion to the support 15. Since the end wall 8 is unsupported over its bottom extremity by the sidewalls, it has a stiffening member 8b secured thereto. Formed in sidewalls 6 and 7, respectively, are channels or guide tracks 9 and 10 which have elevated portions 9a and 10a, and slope downwardly along slopes 9b and 10b to their lower planar portions 9c and 10c. Throughout a substantial portion of their lengths, the guide tracks 9 and 10 are in parallel spaced-apart relation, see FIGURE 2; however, the guide track 9 has an arcuate extension portion 9d at its one end which is defined by a radial line having its center of rotation at the end 10d of the guide track 10, which is defined by an up-turned tab or positive stop 10e. Also, the guide track 9 has a round headed bolt 12 secured through its sidewall at the transition point between its elevated portion 9a and slope 9b and a round headed bolt 13 secured through its sidewall at its lower end. These bolts act as detents to hold the positioning portion in its extended and retracted positions, as will more clearly appear.

The positioning portion 3, FIGURES 1, 2 and 3, which cooperates with the mounting portion 2, just described, comprises a preferably triangular main body plate portion 20 having guide legs 21 and 22 extending from the opposite side edges of the body 20, a guide leg 23 extending from its top surface and three support posts 24 extending from its bottom surface. Axially slidably and rotatably mounted on the ends of the guide legs 21 and 22 are balls or guides 21a and 22a, respectively, which fit within the guide tracks 9 and 10 of the mounting portion. To take up any free play in this guide structure, a coil spring 21b is interposed between leg 21 and guide 21a to bias the guides 21a and 22a into firm engagement with the end walls of the guide tracks 9 and 10.

Figure 5:
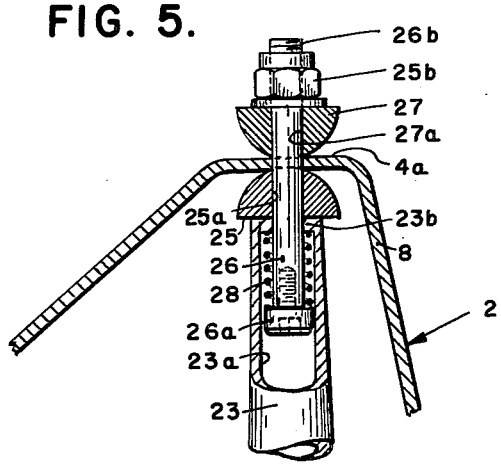
FIGURE 5 is a fragmentary view, partially in section, of a guide leg taken along the reference line 5—5 of FIGURE 2.

As best seen in FIGURE 5, the third guide leg 23 is of hollow construction, having the bore 23a therein, and is substantially perpendicularly related with respect to the guide legs 21 and 22. An annular flange 23b is provided at the top of the bore 23a and a half ball guide 25 having a hole 25a therethrough is mounted on top of the annular flange. A rod 26 having a head 26a and a threaded end 26b is mounted with its head end in sliding fit relation within the bore 23a. The threaded end 26b of rod 26 is fitted through slot 5 in the mounting portion 1, through the hole 25a in the first half ball guide 25, through the hole 27a in a second half ball guide 27, and threadably engages the lock nut 25b. A coil spring 28 is mounted on rod 26 within the bore 23a of guide leg 23 in cooperating engagement with the head 26a and annular flange 23b to resiliently bias the guide formed by the half ball guides 25 and 27 into engagement with the opposite sides of the top surface 4 of mounting portion 2. To complete the structure of the positioning portion 3, a mounting bracket 29, having positioning handles 29a on its opposite sides, is secured to the free ends of support posts 24.

In operation, with the positioning portion 3 in its stowed position, the guide leg 23 is located at the end 5a of slot 5 on the elevated surface 4a and the guide legs 21 and 22 are disposed on the upper surfaces 9a and 10a of the guide tracks 9 and 10. Maintaining the positioning portion 3 in its stowed position is the detent 12 over which the guide 22a must ride before it may move. To move the positioning portion 3 from its stowed position, the handles 29a of bracket 29 are grasped and pulled to the left as seen in FIGURE 1, causing the guides 21a and 22a of guide legs 21 and 22 to follow the guide tracks 9 and 10 and half ball guides 25 and 27 of guide leg 23 to follow the guide track 5, with the guide 21a first moving axially out of the way of detent 12 against the biasing force of spring 21b. Upon the clearing of detent 12 by guide 21a, the guides 21a and 22a move in a relatively straight line down slopes 9b and 10b and out along the lower guide track portions 9c and 10c until guide 22a is positioned at the end 10d of track 10 against positive stop 10e and the guide 21a is positioned at the beginning of the arcuate portion 9d of the track 9. During this time, the half ball guides 25 and 27 have moved down slope 4b and out along surface 4c until they are positioned at point 5b on the track 5. Upon further movement of the positioning portion 2, the half ball guides 25 and 27 move down the slope 4d from point 5b to point 5c at an angle with respect to their original axis of movement in a direction toward guide track 9 permitting the guide 21a to move along arcuate portion 9d pivoting about guide 22a, which has stopped at point 10d. Movement of the half ball guides 25 and 27 down the slope 4d between points 5b and 5c also causes the positioning portion 3 to be rotated through an arc about an axis through the guides 21a and 22a to tilt the front of the positioning mechanism in an upward direction to facilitate viewing of the front of an apparatus mounted thereon from above. It is to be understood, however, that in certain applications it may be desired not to tilt the positioning apparatus 3 in which case the portion of track 5 between points 5b and 5c would not be sloped. Immediately before guide 21a contacts the support 15 at the end of its travel, it rides over the detent 13 which locks the positioning portion 3 in its extended position. Movement of the positioning portion in the opposite direction is accomplished in a reverse manner.

In summary, the apparatus positioning mechanism of this invention is a simple and effective device for positioning an apparatus between selected positions in either a straight or curvilinear path. The positioning mechanism is also quite inexpensive because it has no expensive machine tooled guide structure. Instead, the positioning mechanism is provided with guides which are resiliently biased into guided engagement with the guide tracks of the positioning portion. Also, the mounting portion and the positioning portion are each of unitary construction making installation of the positioning mechanism in any position or application a relatively simple matter.

While a particular embodiment of the invention has been illustrated and described, it will be obvious to those skilled in the art that various changes and modifications may be made without departing from the invention; and it is intended to cover in the appended claims all such modifications and equivalents as fall within the true spirit and scope of this invention.

What is claimed is:
1. A positioning mechanism comprising in combination:
a mounting portion;
a first slot guide track formed through said mounting portion;
second and third guide tracks formed in said mounting portion in symmetrical spaced-apart relation with respect to said first slot guide track;
a positioning portion;
first and second guide legs extending from said positioning portion toward said first and second guide tracks on said mounting portion;
a third guide leg extending from said positioning portion toward said third slot guide track;
first and second guides on said first and second guide legs in guided engagement with said first and second guide tracks;
and a third guide mounted on said third guide leg,
said third guide having guide portions in engagement with the opposite sides of said slot guide track.

2. The positioning mechanism of claim 1 including resilient means biasing said guide portions of said third guide leg into resilient engagement with the opposite sides of said slot guide track.

3. A positioning mechanism comprising:
a mounting portion having a surface and a pair of side walls connected to said surface on opposite sides thereof;
a separate track means formed in each of said side walls;
another track means formed in said surface;
a positioning portion;
a guide leg extending from said positioning portion to each of said track means; and
a guide mounted in each of said guide legs, each of said guides being disposed in guided and supported engagement with one of said track means.

4. A positioning mechanism comprising:
a mounting portion having a surface and a pair of side walls connected to said surface on two sides thereof;
a first track means associated with one of said side walls along a substantial portion of the length thereof;
a second track means associated with the other of said side walls and being coplanar with said first track means, said second track means having a first portion disposed substantially parallel to said first track means and having a second arcuate portion;
a third track means associated with said surface;
a positioning portion;
a guide leg extending from said positioning portion to each of said track means; and
a guide mounted in each of said guide legs, each of said guides being disposed in guided and supported engagement with one of said track means.

5. The invention as in claim 4, wherein:
said arcuate portion of said second track means describes an arc segment whose center is an end of said first track means.

6. The invention as in claim 5, wherein:
said third track means is configured to permit the guide disposed therein to describe the path of travel that occurs when said positioning portion is traversed with respect to said mounting portion with said guides disposed in each of said first and second track means being maintained normal to the respective track means.

7. In a positioning mechanism:
a mounting portion;

at least three spaced-apart guide tracks on said mounting portion;
a positioning portion;
a guide leg extending from said positioning portion toward each of said guide tracks;
a guide located on each of said guide legs, each of said guides cooperatingly guidably engaging one of said guide tracks; and
at least one of said guide tracks being provided with detent means for cooperation with one of said guides to define stops for said mounting portion.

8. A positioning mechanism comprising in combination:
a mounting portion;
a first slot guide track formed through said mounting portion;
second and third guide tracks formed in said mounting portion in spaced-apart relation with respect to said first slot guide track;
a positioning portion;
a guide leg extending from said positioning portion toward each of said guide tracks;
a guide on each of said guide legs, each of said guides being in cooperating engagement with one of said guide tracks, each of said guides being axially slidably mounted on its guide leg; and
biasing means maintaining each of said guides in resilient biasing engagement with the guide track with which it is engaged.

9. A positioning mechanism comprising in combination:
a mounting portion;
a first slot guide track formed through said mounting portion;
second and third guide tracks formed in said mounting portion in spaced-apart relation with respect to said first slot guide track;
a positioning portion;
a guide leg extending from said positioning portion toward each of said guide tracks;
a guide on each of said guide legs, each of said guides being in cooperating engagement with one of said guide tracks;
one of said guides being mounted in resilient biasing engagement with said slot guide track and including a half ball guide disposed on each side of said slot guide track;
a rod interconnecting said half ball guides, said rod extending through said slot guide track into the terminal end of said guide leg on which said guide is located; and
resilient means interposed between the terminal end of said guide leg and said rod resiliently biasing the half ball guides of said guide into resilient supporting engagement with the mounting portion structure defining said slot guide track.

References Cited by the Examiner

UNITED STATES PATENTS

| 1,918,190 | 7/33 | Miller et al. | 248—417 |
| 2,595,992 | 5/52 | Tapp et al. | 104—63 |
| 2,695,831 | 11/54 | Sigal | 312—246 |

CLAUDE A. LE ROY, *Primary Examiner*.